United States Patent
Braun et al.

[11] 3,768,146
[45] Oct. 30, 1973

[54] METHOD OF SPLICING OPTICAL FIBERS

[75] Inventors: Frank Adolf Braun, Lincroft; Ralph Francis Trambarulo, Red Bank, both of N.J.

[73] Assignee: Bell Telephone Laboratories, Incorporated, Murray Hill, N.J.

[22] Filed: Feb. 22, 1972

[21] Appl. No.: 227,908

[52] U.S. Cl............. 29/460, 29/467, 29/517, 350/96 R, 350/320, 287/108
[51] Int. Cl............. B21d 39/00, B23p 11/00
[58] Field of Search ............ 29/517, 630 A, 630 F, 29/460, 467; 350/96 B, 320, 96 R; 287/108

[56] References Cited
UNITED STATES PATENTS

| | | | |
|---|---|---|---|
| 2,965,147 | 12/1960 | Hoffman | 29/630 F |
| 3,198,059 | 8/1965 | Phaneuf et al. | 350/96 B |
| 3,301,648 | 1/1967 | Sheldon | 350/96 B UX |
| 3,655,275 | 4/1972 | Seagreaves | 350/96 B UX |
| 3,705,756 | 12/1972 | Keller et al. | 350/96 B |
| 3,455,625 | 7/1969 | Brumley et al. | 350/96 B |

FOREIGN PATENTS OR APPLICATIONS

| | | | |
|---|---|---|---|
| 531,447 | 8/1955 | Italy | 29/517 |

*Primary Examiner*—Charlie T. Moon
*Attorney*—W. L. Keefauver et al.

[57] ABSTRACT

Apparatus, and a method of splicing optical fibers which includes placing the fibers in a V-shaped groove, slipping a pliable, metallic sleeve over the fiber ends, and then crimping the sleeve, thereby simultaneously aligning and mechanically securing the two fibers.

3 Claims, 3 Drawing Figures

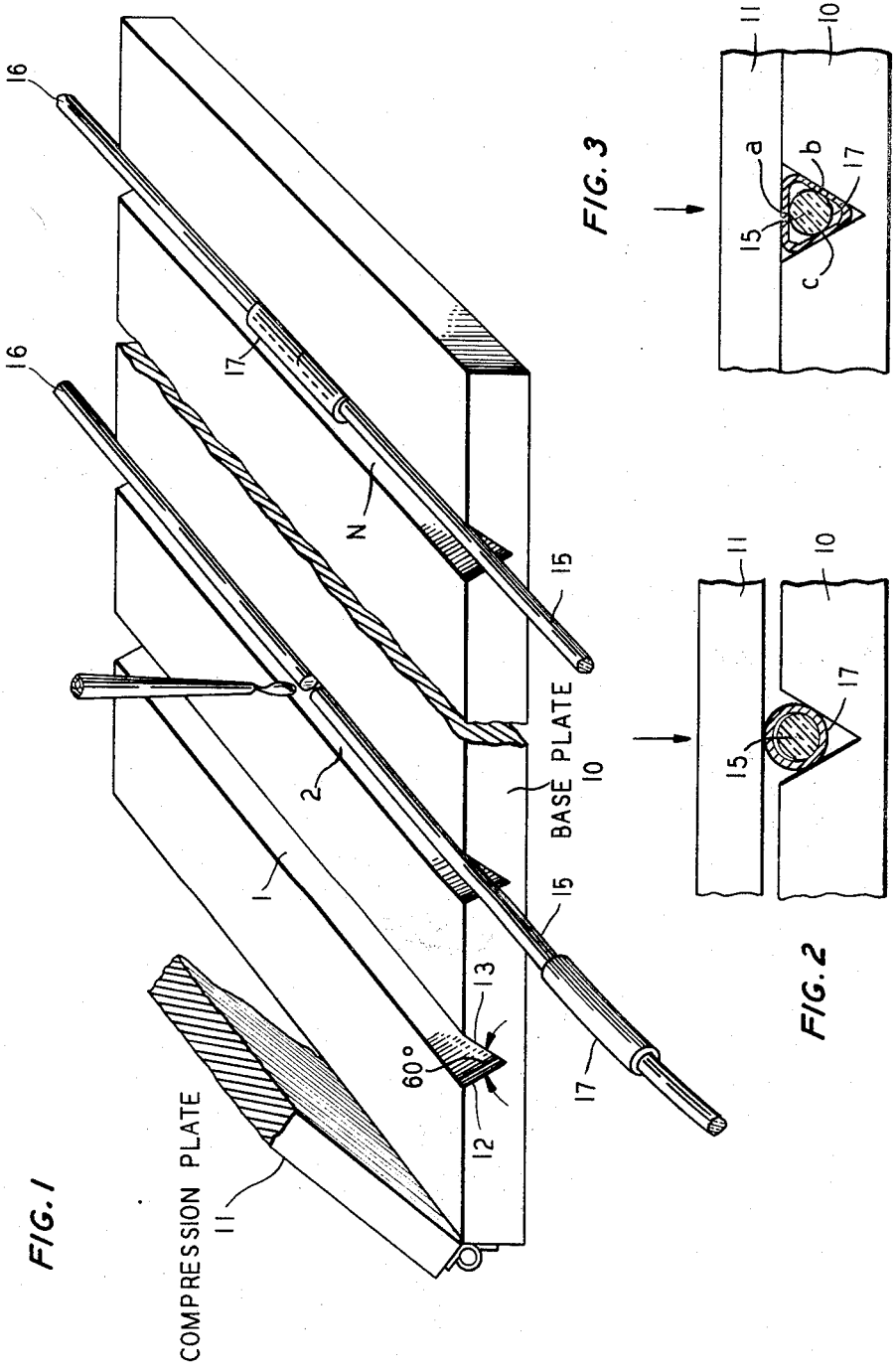

METHOD OF SPLICING OPTICAL FIBERS

This invention relates to apparatus and methods for splicing optical fibers.

BACKGROUND OF THE INVENTION

There is, currently, a great deal of interest in using dielectric fibers as waveguides at optical frequencies in much the same way as wires and metallic waveguides are used at the lower frequencies. However, if such fibers are to be used in this way, it is evident that there will be a corresponding need for a quick, convenient and inexpensive means for splicing sections of fibers together in the course of their use.

Accordingly, it is the broad object of this invention to splice optical fibers in a mechanically sound and optically efficient manner.

More particularly, it is an object of the invention to splice optical fibers in a manner which automatically aligns the fibers during the splicing process.

SUMMARY OF THE INVENTION

In accordance with the present invention, the fibers to be spliced are placed, end-to-end, in a V-shaped groove, the sides of which form two sides of an equilateral triangle. A metallic sleeve is then slipped over the ends and compressed by means of a compression plate.

It is an advantage of the invention, that the crimping of the metallic sleeve simultaneously aligns the two fibers and mechanically secures them.

It is a further advantage of the invention that the metallic sleeve is the only thing added to the structure, and its size is of the order of the fibers.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 1 shows apparatus for splicing optical fibers in accordance with the present invention;

FIG. 2 shows the fiber and sleeve just prior to crimping; and

FIG. 3 shows the fiber and sleeve after crimping.

DETAILED DESCRIPTION

Referring to the drawings, FIG. 1 shows apparatus for splicing optical fibers, in accordance with the present invention, comprising a base plate 10 along one surface of which there are cut one or more V-shaped grooves 1,2 ... N and a flat compression plate 11. Each of the grooves has two equal sides 12 and 13 which meet at a 60° angle, thus forming two sides of an equilateral triangle. The third side of the triangle is provided by the compression plate, as will be described in greater detail hereinbelow.

In operation, the two fibers to be spliced are placed, end-to-end, in a groove, as illustrated by fibers 15 and 16 in groove 2. While the ends of the fibers need not be optically polished, it is preferred that they be flat and that a drop of fluid, having a matching refractive index, be placed at the junction of the two fibers. Advantageously the ends to be spliced are scored with a razor blade, or other sharp instrument, and broken off. This generally leaves an adequately flat surface.

So aligned and prepared, a metallic sleeve 17, that had been previously slipped over one of the fibers 15, is now moved into position over the ends of the abutting fibers, as illustrated in groove N of the base plate. Using the same identification numerals, sleeve 17 is located so that fibers 15 and 16 meet approximately at the center of the sleeve.

Thus prepared, the compression plate is lowered onto the base plate, as illustrated in FIG. 2. The latter shows a cross-sectional view of fiber 15 and metal sleeve 17 just as the compression plate 11 makes contact with the latter. FIG. 3 shows the same components after the pressure plate 11 is fully depressed and has made contact with the upper surface of the base plate 10. It will be noted that the metal sleeve has been deformed and been forced into contact with the fiber at points $a$, $b$ and $c$. This crimping of the metal sleeve serves two functions. Because the V-shaped grooves and the compression plate form an equilateral triangle, the forces acting upon the sleeve are equal at the three contact points. The resulting effect is to align automatically the two fibers along a common longitudinal axis. The crimping also serves to secure the two fibers, making a firm mechanical joint which is as strong, if not stronger, than the fibers themselves.

It will be recognized that if the groove is too deep, the metal sleeve will not grab the fiber securely. Conversely, if the groove is too shallow, the fiber will shatter. The simplest way to determine the best groove depth is to construct a tapered test groove of varying depth and by a series of tests at different depths along the groove, ascertain the best depth. For example, consistently good results were obtained for clad fibers, having an outside diameter of 0.0028 of an inch, spliced by means of a copper sleeve, having an inside diameter of 0.004 of an inch and a wall thickness of 0.003 of an inch, set in a groove having a depth of 0.009 of an inch. A drop of glycerine ($n = 1.47$) at the fiber ends provided an adequate match for these fibers whose cores had a refractive index of 1.62. Measured transmission through the splices was better than 97 percent.

It will be recognized that, in practice, many splices would be done simultaneously, the exact number being dependent upon the number of grooves available in the base plate. Also, the use of copper for the sleeve material is merely illustrative, as other metals, such as aluminum, can just as readily be used. Thus, in all cases it is understood that the above-described arrangement is illustrative of but one of the many possible specific embodiments which can represent applications of the principles of the invention. Numerous and varied other arrangements can readily be devised in accordance with these principles by those skilled in the art without departing from the spirit and scope of the invention.

We claim:

1. A method of splicing optical fibers comprising the steps of:

placing the two fibers to be spliced in a V-shaped groove;

slipping a metal sleeve over the adjacent ends of the fibers;

and pressing down on the sleeve, crimping it and, thereby, simultaneously aligning and mechanically securing said two fibers.

2. The method according to claim 1 including the step of placing a drop of matching fluid between said fiber ends.

3. The method according to claim 1 wherein said V-shaped grooves have two equal sides meeting at a 60° angle.

* * * * *